United States Patent
Zheng et al.

(10) Patent No.: US 12,449,710 B2
(45) Date of Patent: Oct. 21, 2025

(54) EYE-LIKE FOCUSING METASURFACE SYSTEM DRIVEN BY SUPERVISED-EVOLVING LEARNING ALGORITHM

(71) Applicant: ZHEJIANG UNIVERSITY, Hangzhou (CN)

(72) Inventors: Bin Zheng, Hangzhou (CN); Huan Lu, Hangzhou (CN); Jiwei Zhao, Hangzhou (CN); Rongrong Zhu, Hangzhou (CN); Hongsheng Chen, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 305 days.

(21) Appl. No.: 18/244,302

(22) Filed: Sep. 11, 2023

(65) Prior Publication Data

US 2024/0345448 A1  Oct. 17, 2024

Related U.S. Application Data

(63) Continuation of application No. PCT/CN2023/092706, filed on May 8, 2023.

(30) Foreign Application Priority Data

Apr. 11, 2023 (CN) .......................... 202310404576.3

(51) Int. Cl.
  *G02B 1/00* (2006.01)
  *G02B 27/00* (2006.01)
  (Continued)

(52) U.S. Cl.
  CPC ............. *G02F 1/294* (2021.01); *G02B 1/002* (2013.01); *G02B 27/0012* (2013.01); *G02F 1/3132* (2013.01); *G02B 2207/101* (2013.01)

(58) Field of Classification Search
  CPC .......................... G02B 1/002; G02B 27/0012
  See application file for complete search history.

(56) References Cited

U.S. PATENT DOCUMENTS

2021/0373200 A1* 12/2021 Luo .................... G02B 5/1814

FOREIGN PATENT DOCUMENTS

| CN | 111190163 A | 5/2020 |
| CN | 112115639 A | 12/2020 |

(Continued)

OTHER PUBLICATIONS

Dashuang Liao, Manipulations of Electromagnetic Waves by Reconfigurable Metasurfaces, Zhejiang University PhD Thesis, 2020, pp. 1-116.

(Continued)

*Primary Examiner* — Joseph P Martinez
(74) *Attorney, Agent, or Firm* — Bayramoglu Law Offices LLC

(57) ABSTRACT

An eye-like focusing metasurface system driven by a supervised-evolving learning algorithm, comprises: a transmissive metasurface, an array probe, a focusing guidance module, and an evolving learning module, wherein, after an external electromagnetic wave signal penetrates through the transmissive metasurface, the array probe arranged behind the transmissive metasurface detects external electromagnetic wave data, by means of analysis of the focusing guidance module and the evolving learning module, a regulation and control strategy for the transmissive metasurface is outputted, and the state of the transmissive metasurface changes; then the array probe collects new data, and the focusing guidance module and the evolving learning module further analyze the intensity and the characteristics of the external electromagnetic wave data and output a next regulation and control instruction; the process is repeated until (Continued)

the external electromagnetic wave is focused to a specified position.

7 Claims, 7 Drawing Sheets

(51) Int. Cl.
  *G02F 1/29*    (2006.01)
  *G02F 1/313*   (2006.01)

(56) References Cited

FOREIGN PATENT DOCUMENTS

| JP | 2020060396 A | 4/2020 |
| WO | 2022004260 A1 | 1/2022 |
| WO | 2022228786 A1 | 11/2022 |

OTHER PUBLICATIONS

Guohong Du, et al., Design of a Reflective Metasurface for Near-Field Focusing, IEEE, 2021, pp. 323-324.

Krupali D. Donda, et al., Evolutionary Algorithms for Designing Metalenses, 2018 3rd International Conference on Microwave and Photonics (ICMAP 2018), 2018.

Tao Shan, et al., Coding Programmable Metasurfaces Based on Deep Learning Techniques, IEEE Journal on Emerging And Selected Topics In Circuits and Systems, 2020, pp. 114-125, vol. 10 No. 1.

* cited by examiner ated electric field $E_{Test}$, $C(E_{Theory}, E_{Test})$ is a covariance of the
EYE-LIKE FOCUSING METASURFACE SYSTEM DRIVEN BY SUPERVISED-EVOLVING LEARNING ALGORITHM

CROSS-REFERENCES TO THE RELATED APPLICATIONS

This application is a continuation of International Patent Application No. PCT/CN2023/092706 filed on May 8, 2023, which claims priority based on Chinese patent application 202310404576.3 filed on Apr. 11, 2023, the entire contents of which are incorporated herein by reference.

TECHNICAL FIELD

The present invention relates to the technical field of intelligent electromagnetic metasurfaces, and in particular to an eye-like focusing metasurface system driven by a supervised-evolving learning algorithm.

BACKGROUND

Focusing of light is an ancient topic that has existed for thousands of years, with widespread applications in biology, photonics, and physics, and scientists' enthusiasm for its study has never waned. Conventional optical focusing lenses are typically manufactured based on various bulky substrates. By appropriate design of the microstructure, a user-defined light beam intensity or shape is produced. The appearance of electromagnetic metasurfaces provides the possibility of miniaturization and integration of optical lenses. The metasurface is an artificially designed structure that consists of a series of sub-wavelength unit cells. By careful design of sub-wavelength elements and spatial layout, researchers have developed devices with a variety of functions, such as beam polarization, focusing, imaging, etc. Among many functional devices, the metalens is the most widely used one. The metalens can focus the incident light with a more compact size than a conventional bulky lens.

Over the past decade, scholars have designed a large number of metasurface focusing systems (metalenses) to achieve the broadband achromatic function, high efficiency, and other functions. Achieving the adaptive focusing of electromagnetic waves (light) has important significance in the aspects of electromagnetic spectrum imaging, communication channel enhancement and the like. However, the conventional focusing devices can only operate in a predetermined environment, and when the incident environment changes, the structure or unit array needs to be redesigned because the conventional focusing devices do not have the adaptive function. Although many intelligent optical devices are produced from the combination of artificial intelligence (deep learning) and metasurfaces, their success depends largely on the amount and quality of training data available and requires environmental information in advance, because the single deep learning approach may fail in the face of a focusing task in a rapidly changing environment. Human eyes are a perfect focusing system, have high adaptability to environmental changes, and can sense more than 80% of environmental information. If a natural intelligent focusing system (such as human eyes) can be designed, the automatic convergence of electromagnetic waves (light) can be achieved in different environments, which can greatly simplify the design of equipment and bring convenience to application. Therefore, how to provide a metasurface system capable of adaptive intelligent focusing is an urgent problem to be solved by those skilled in the art.

SUMMARY

In view of the above, the present invention provides an eye-like focusing metasurface system driven by a supervised-evolving learning algorithm, in which the supervised-evolving learning is taken as a basic algorithm framework, when an electromagnetic wave is randomly incident on a metasurface, the track of transmission beams is controlled by adaptively adjusting the state of the metasurface through the learning and evolution of the algorithm, such that the focusing of the external electromagnetic wave to any specified position can be achieved in a complex electromagnetic environment. The system is suitable for various applications, including electromagnetic space imaging, communication signal enhancement, wireless charging and the like.

In order to achieve the above objective, the present invention provides the following technical solution:

Provided is an eye-like focusing metasurface system driven by a supervised-evolving learning algorithm, which comprises: a transmissive metasurface, an array probe, a focusing guidance module, and an evolving learning module, wherein, after an external electromagnetic wave signal penetrates through the transmissive metasurface, the array probe arranged behind the transmissive metasurface detects external electromagnetic wave data, the focusing guidance module and the evolving learning module analyze an external electromagnetic wave and output a regulation and control strategy for the transmissive metasurface, and a state of the transmissive metasurface changes; then the array probe collects new external electromagnetic wave data, and the focusing guidance module and the evolving learning module further analyze an intensity and characteristics of the external electromagnetic wave data and output a next regulation and control instruction; the process is repeated until the external electromagnetic wave is focused to a specified position.

Optionally, to stop repeated iteration after the external electromagnetic wave is focused to the specified position, the following judgment conditions need to be simultaneously satisfied:

$$r(E_{Theory}, E_{Test}) = \frac{C(E_{Theory}, E_{Test})}{\sqrt{\text{Var}[E_{Theory}]\text{Var}[E_{Test}]}} > 85\%$$

$$\rho_m = \frac{E_{Major_{lobe}}}{E_{Test_{total}}} \geq 30\%$$

$$\rho_s = \frac{E_{Side\_lobe}}{E_{Test\_total}} < 30\%$$

in the formula, $r(E_{Theory}, E_{Test})$ is an effective correlation coefficient of a theoretical electric field $E_{Theory}$ and a test electric field $E_{Test}$, $C(E_{Theory}, E_{Test})$ is a covariance of the theoretical electric field $E_{Theory}$ and the test electric field $E_{Test}$, $\text{Var}[E_{Theory}]$ is a variance of the theoretical electric field $E_{Theory}$, $\text{Var}[E_{Test}]$ is a variance of the test electric field $E_{Test}$, $\rho_m$ is a main lobe energy ratio of the electromagnetic wave, $E_{Major_{lobe}}$ is a main lobe energy of the electromagnetic wave, $E_{Test_{total}}$ is a total measured electric field energy, $\rho_s$ is a total side lobe energy ratio of the electromagnetic wave, and $E_{Side\_lobe}$ is a side lobe energy of the electromagnetic wave.

Optionally, the transmissive metasurface is formed by arranging a plurality of unit cells with different switch states, each unit cell being composed of three metal layers; the three metal layers are separated by two layers of F4B media, a surface of a first metal layer is welded with 2 PIN switch diodes, and switch states of the PIN switch diodes are controlled by applied voltages.

Optionally, the unit cells of the transmissive metasurface, when being externally connected to positive and negative voltages, can cause currents to flow in forward and reverse directions, a binary phase can be realized with an electromagnetic wave incidence at −50°-50°, and a transmissivity is greater than 95% under a working frequency.

Optionally, the focusing guidance module is a focus steering network, and the focus steering network consists of a mapping of compensation phases $\Delta\varphi_t$ generated by an electric field $e_t$ to all the unit cells on the transmissive metasurface:

$$\Delta\varphi_t = [\Delta\varphi_t^{(1)}, \ldots, \Delta\varphi_t^{(i)}, \ldots, \Delta\varphi_t^{(N)}] = f_\theta(e_t)$$

in the formula, $\Delta\varphi_t^{(i)}$ is a focus compensation phase required to be satisfied for an $i^{th}$ unit cell, $i \in [1,N]$, and $\theta$ is a network parameter during the training of the focus steering network.

Optionally, the evolving learning module regulates and controls a voltage of each unit state of the transmissive metasurface at moment t+1 according to the compensation phase $\Delta\varphi_t$ and the collected electric field $e_t$, and a voltage updating scheme is as follows:

$$u_{t+1} = u_t - \frac{\alpha m_t}{1 - \beta_1^t} \cdot \frac{\sqrt{1 - \beta_2^t}}{\sqrt{v_t} + \epsilon\sqrt{1 - \beta_2^t}}$$

in the formula, $u_t$ and $u_{t+1}$ represent regulation and control voltages at moment t and moment t+1, respectively, $\alpha$ and $\epsilon$ are learning parameters, $\beta_1$ and $\beta_2$ are attenuation coefficients of first and second order moments, respectively, $\beta_1^t$ is t power of $\beta_1$, $\beta_2^t$ is t power of $\beta_2$, $m_t$ is a first order moment of a gradient at moment t, and $v_t$ is a second order moment of a gradient at moment t.

Optionally, calculation formulas of $m_t$ and $v_t$ are as follows:

$$m_t = \beta_1 m_{t-1} + (1 - \beta_1)g_t$$

$$v_t = \beta_2 v_{t-1} + (1 - \beta_2)g_t^2$$

in the formulas, $g_t$ is a gradient, $m_{t-1}$ is a first order moment of a gradient at moment t−1, and $v_{t-1}$ is a second order moment of a gradient at moment t−1.

As can be seen from the above technical solution, compared with the prior art, the present invention discloses an eye-like focusing metasurface system driven by a supervised-evolving learning algorithm, which has the following beneficial effects:

1. The adaptive focusing system designed according to the present invention can achieve intelligent focusing at any position under various electromagnetic environments, does not need artificial regulation and control, and thus is flexible to use;

2. The supervised-evolving learning algorithm framework constructed according to the present invention can adaptively and intelligently adjust an output scheme under different environments, so as to make up the defect that the conventional machine learning cannot be environment-adaptive;

3. The sub-wavelength metasurface structure designed according to the present invention has a small volume, simple manufacture and easy integration and realization;

4. The high-transmissivity metasurface unit designed according to the present invention has a transmissivity of 95% or more at different incidence angles, high transmissivity and stable performance.

BRIEF DESCRIPTION OF THE DRAWINGS

In order to more clearly illustrate the technical solution in the embodiments of the present invention or in the prior art, the drawings required to be used in the description of the embodiments or the prior art are briefly introduced below. It is obvious that the drawings in the description below are merely embodiments of the present invention, and those of ordinary skilled in the art can obtain other drawings according to the drawings provided without creative efforts.

DETAILED DESCRIPTION OF THE EMBODIMENTS

The technical solution in the embodiments of the present invention will be clearly and completely described below with reference to the drawings in the embodiments of the present invention, and it is obvious that the described embodiments are only a part of the embodiments of the present invention but not all of them. Based on the embodiments of the present invention, all other embodiments obtained by those of ordinary skilled in the art without creative efforts shall fall within the protection scope of the present invention.

Figure 1:
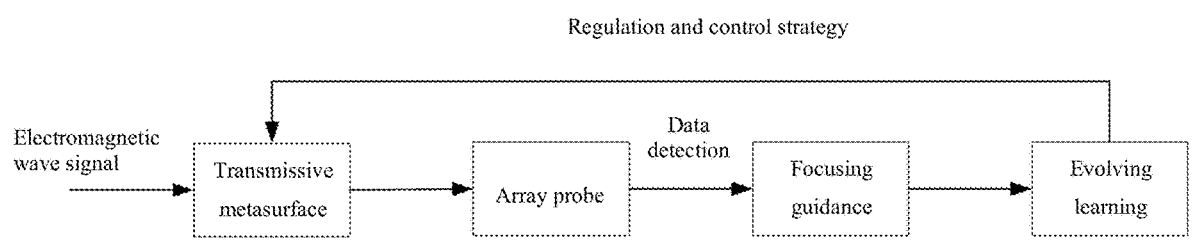
FIG. 1 is a schematic diagram of an eye-like focusing metasurface system according to the present invention.

Disclosed in the embodiment of the present invention is an eye-like focusing metasurface system driven by a supervised-evolving learning algorithm, as shown in FIG. 1, which comprises: a transmissive metasurface, an array probe, a focusing guidance module, and an evolving learning module, wherein, after an external electromagnetic wave signal penetrates through the transmissive metasurface, the array probe arranged behind the transmissive metasurface detects external electromagnetic wave data, the focusing guidance module and the evolving learning module analyze an external electromagnetic wave and output a regulation and control strategy for the transmissive metasurface, and a state of the transmissive metasurface changes; then the array probe collects new external electromagnetic wave data, and the focusing guidance module and the evolving learning module further analyze an intensity and characteristics of the external electromagnetic wave data and output a next regulation and control instruction; the process is repeated until the external electromagnetic wave is focused to a specified position.

Specifically, the principle of the eye-like adaptive focusing system is as follows: the incident light penetrates through the crystalline lenses and reaches photosensitive cells on the retina, at the moment, optical signals are converted into electric signals to be perceived by the human brain, the brain analyzes the signals and then outputs a crystalline lens adjusting strategy through a nervous system, at the moment, the ciliary muscles/crystalline lenses of eyes expand or contract according to system instructions, the signal intensity received by the photosensitive cells changes, and the human brain further analyzes the signal characteristics of the moment and outputs a regulation and control instruction; the process is carried out iteratively until the light is perfectly focused on the retina. The transmissive metasurface of the present invention is taken as a crystalline lens, the array probe is taken as a photosensitive cell, and the focusing guidance module and the evolving learning module are taken as a human brain for analysis.

Specifically, a supervised-evolving learning algorithm framework composed of the focusing guidance module and the evolving learning module, a transmissive metasurface structure, and an external electromagnetic environment, jointly form a closed-loop adaptive iterative system of "environmental data collection-algorithm prediction-metasurface regulation and control-environmental data collection", wherein the external electromagnetic environments comprise a single-source electromagnetic environment, a multi-source electromagnetic environment, and an electromagnetic environment with unknown scatterers, which are incident in any direction; the supervised-evolving learning algorithm is composed of a supervision learning process and an evolving learning process, wherein the core of the supervision learning is convolutional neural network, and the core of the evolving learning is an adaptive moment estimation (Adam) gradient descent algorithm.

Furthermore, to stop repeated iteration after the external electromagnetic wave is focused to the specified position, the following judgment conditions need to be simultaneously satisfied:

$$r(E_{Theory}, E_{Test}) = \frac{C(E_{Theory}, E_{Test})}{\sqrt{\text{Var}[E_{Theory}]\text{Var}[E_{Test}]}} > 85\%$$

$$\rho_m = \frac{E_{Major\_lobe}}{E_{Test_{total}}} \geq 30\%$$

$$\rho_s = \frac{E_{Side\_lobe}}{E_{Test\_total}} < 30\%$$

in the formula, $r(E_{Theory}, E_{Test})$ is an effective correlation coefficient of a theoretical electric field $E_{Theory}$ and a test electric field $E_{Test}$, $C(E_{Theory}, E_{Test})$ is a covariance of the theoretical electric field $E_{Theory}$ and the test electric field $E_{Test}$, $\text{Var}[E_{Theory}]$ is a variance of the theoretical electric field $E_{Theory}$, $\text{Var}[E_{Test}]$ is a variance of the test electric field $E_{Test}$, $\rho_m$ is a main lobe energy ratio of the electromagnetic wave, $E_{Major\_lobe}$ is a main lobe energy of the electromagnetic wave, $E_{Test_{total}}$ is a total measured electric field energy, $\rho_s$ is a total side lobe energy ratio of the electromagnetic wave, and $E_{Side\_lobe}$ is a side lobe energy of the electromagnetic wave.

Figure 2:
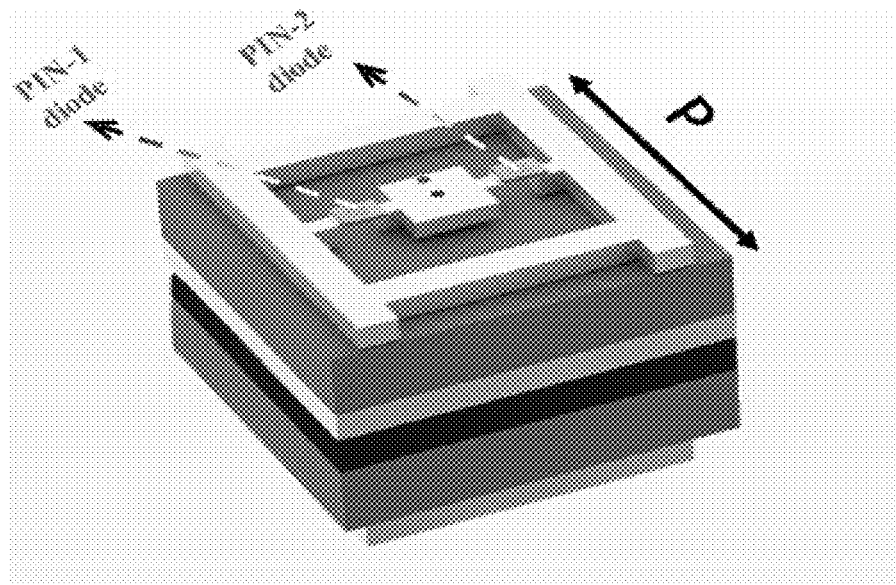
FIG. 2 is a schematic diagram of a unit cell of a transmissive metasurface according to the present invention.

Furthermore, the transmissive metasurface is formed by arranging a plurality of unit cells with different switch states, as shown in FIG. 2, each unit cell being composed of three metal layers; the three metal layers are separated by two layers of F4B media, a surface of a first metal layer is welded with 2 PIN switch diodes, and switch states of the PIN switch diodes are controlled by applied voltages.

Figure 3:
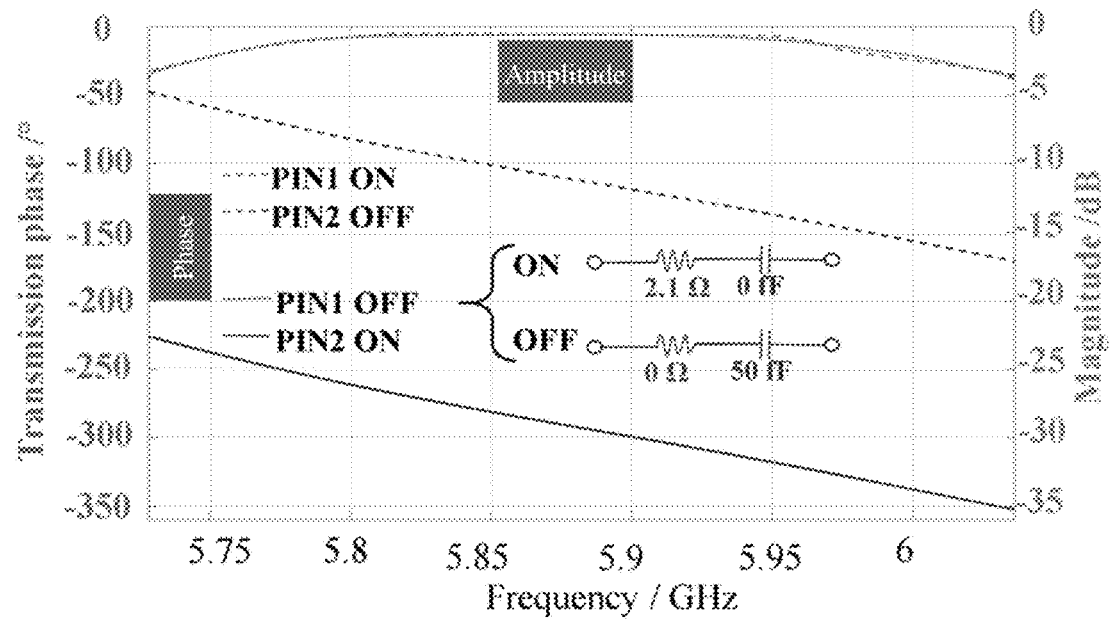
FIG. 3 is a response curve graph of transmission amplitude and phase for a unit cell of the transmissive metasurface according to the present invention.

Specifically, the adjustable transmission unit cell is composed of three metal layers (Cu) and two dielectric layers (the relative dielectric constant is 2.65), and the middle part of the adjustable transmission unit cell is an adhesive layer with the relative dielectric constant of 4.4. The surface of the topmost metal layer is welded with two PIN diodes, and the diodes are grounded through a hole in the middle; as shown in FIG. 3, the dotted lines and the solid lines represent different states of the two diodes, respectively. When the diodes are in an on state, the resistance value thereof is 2.1Ω, and the capacitance value thereof is 0 fF; when the diodes are in an off state, the resistance value thereof is 0Ω, and the capacitance value thereof is 50 fF. In the figure, the abscissa is frequency, the left ordinate is phase, and the right ordinate is amplitude. It can be seen that when the diodes are in different states, the phase thereof is reversed by 180°, and at the working frequency (5.85 GHz-5.95 GHz), the amplitude is above −1 dB.

Furthermore, the unit cells of the transmissive metasurface, when being externally connected to positive and negative voltages, can cause currents to flow in forward and reverse directions, a binary phase can be realized with an electromagnetic wave incidence at −50°-50°, and a transmissivity is greater than 95% under a working frequency.

Furthermore, the focusing guidance module is a focus steering network, and the focus steering network consists of a mapping of compensation phases $\Delta \varphi_t$ generated by an electric field $e_t$ to all the unit cells on the transmissive metasurface:

$$\Delta \varphi_t = \left[ \Delta \varphi_t^{(1)}, \ldots, \Delta \varphi_t^{(i)}, \ldots, \Delta \varphi_t^{(N)} \right] = f_\theta(e_t)$$

Furthermore, $\Delta \varphi_t^{(i)}$ is a focus compensation phase required to be satisfied for an $i^{th}$ unit cell, $i \in [1, N]$, and $\theta$ is a network parameter during the training of the focus steering network.

Furthermore, the evolving learning module regulates and controls a voltage of each unit state of the transmissive metasurface at moment t+1 according to the compensation phase $\Delta\varphi_t$ and the collected electric field $e_t$, and a voltage updating scheme is as follows:

$$u_{t+1} = u_t - \frac{\alpha m_t}{1-\beta_1^t} \cdot \frac{\sqrt{1-\beta_2^t}}{\sqrt{v_t} + \epsilon\sqrt{1-\beta_2^t}}$$

in the formula, $u_t$ and $u_{t+1}$ represent regulation and control voltages at moment t and moment t+1, respectively, $\alpha$ and $\epsilon$ are learning parameters, $\beta_1$ and $\beta_2$ are attenuation coefficients of first and second order moments, respectively, $\beta_1{}^t$ is t power of $\beta_1$, $\beta_2{}^t$ is t power of $\beta_2$, $m_t$ is a first order moment of a gradient at moment t, and $v_t$ is a second order moment of a gradient at moment t.

Furthermore, calculation formulas of $m_t$ and $v_t$ are as follows:

$$m_t = \beta_1 m_{t-1} + (1-\beta_1)g_t$$

$$v_t = \beta_2 v_{t-1} + (1-\beta_2)g_t^2$$

in the formula, $g_t$ is a gradient, $\beta_1$ and $\beta_2$ are attenuation coefficients of first and second order moments, respectively, $m_{t-1}$ is a first order moment of a gradient at moment t−1, and $v_{t-1}$ is a second order moment of a gradient at moment t−1. If the characteristic of the transmissive metasurface is continuously adjustable in voltage-phase, $g_t$ can be realized by curve fitting; if the characteristic of the metasurface is discretely adjustable in voltage-phase, $g_t$ is realized by sampling the normal distribution $\hat{g}_t \sim N(g_t, \sigma^2)$.

Figure 4:
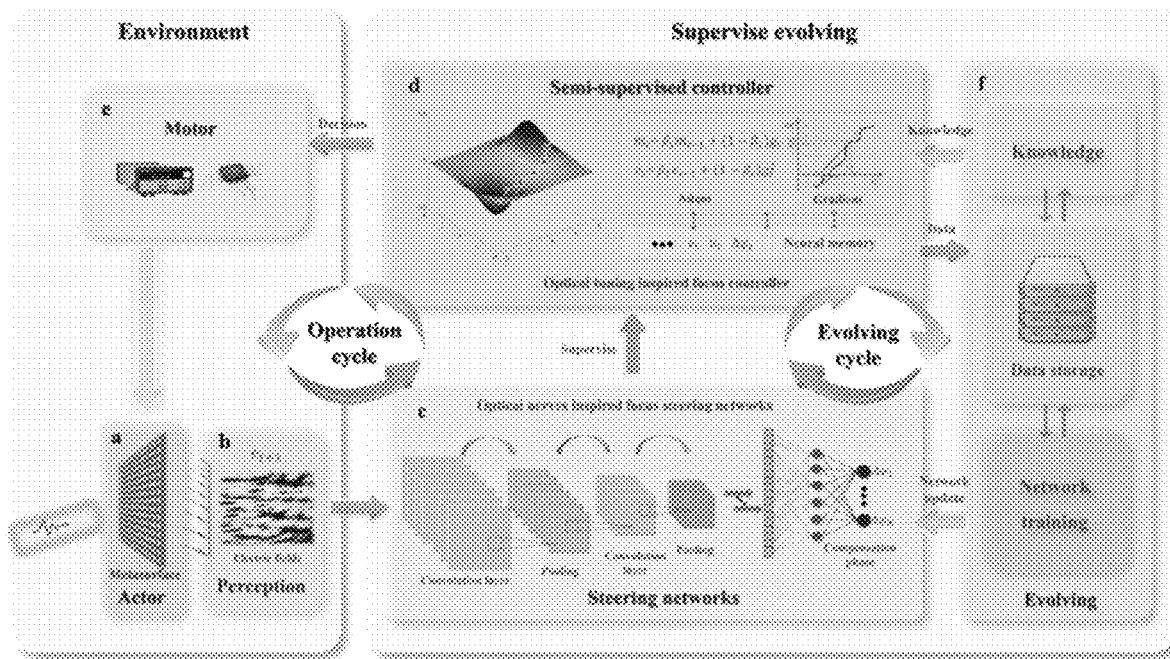
FIG. 4 is a flowchart of a supervised-evolving learning algorithm according to the present invention.

Furthermore, as shown in FIG. 4, the supervised-evolving learning algorithm generally comprises two modules: an operation cycle and an evolving cycle. When electromagnetic waves are incident on the adjustable metasurface (a), the detection array collects electric field data (b), the data are transmitted to a supervision and guidance network (c), and the network outputs an adjustment phase and sends the adjustment phase to a control end (d). At the moment, the algorithm outputs a regulation and control mode for each unit on the metasurface (e), and the state of the metasurface changes. This process is carried out iteratively until the focusing task is completed. In the supervised-evolving process, the algorithm collects the traversed data (f) at the same time, so that subsequent accelerated iteration is facilitated.

Figure 5:
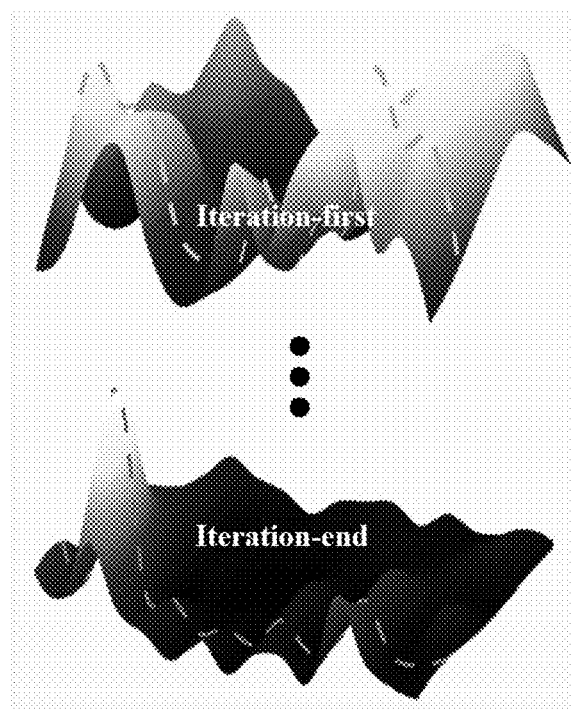
FIG. 5 is a three-dimensional schematic diagram of a single-source electromagnetic data for an electric field according to the present invention.
Figure 6:
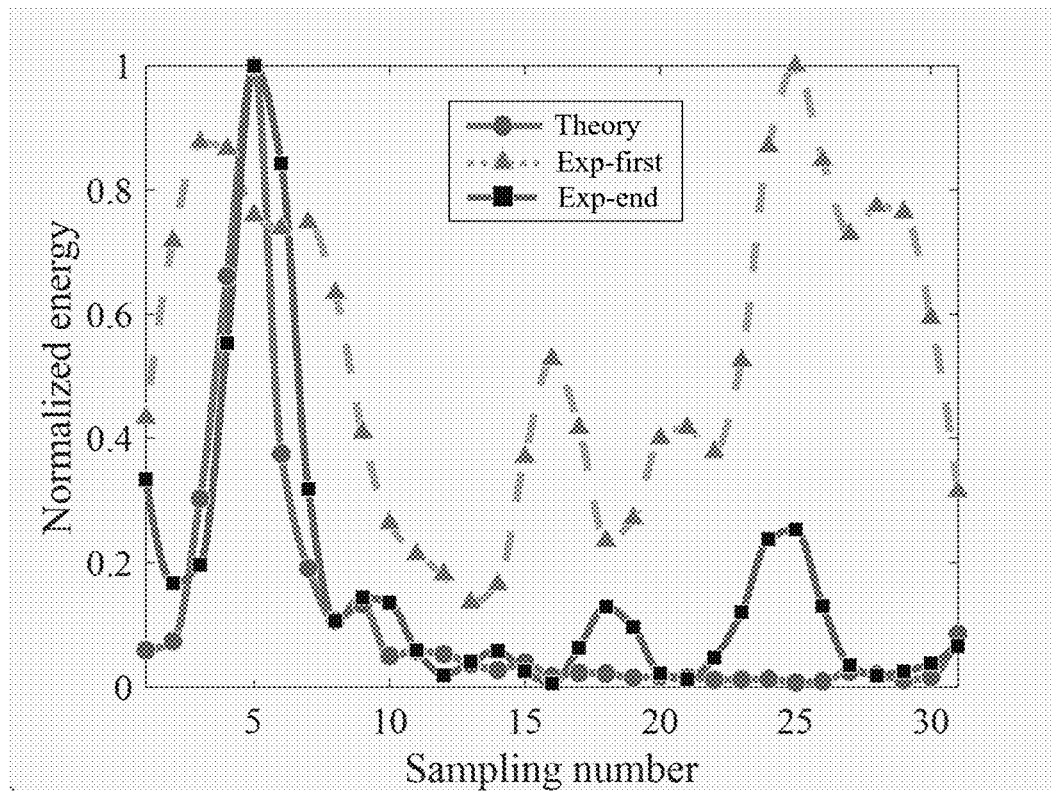
FIG. 6 is a one-dimensional schematic diagram of a single-source electromagnetic data for an electric field according to the present invention.
Figure 7:
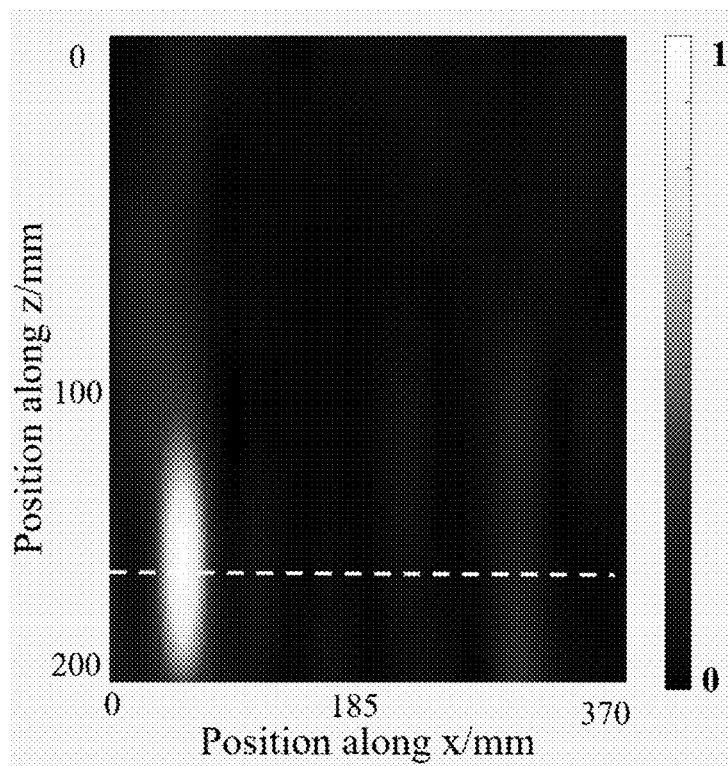
FIG. 7 is a schematic diagram of a single-source electromagnetic focusing result according to the present invention.
Figure 8:
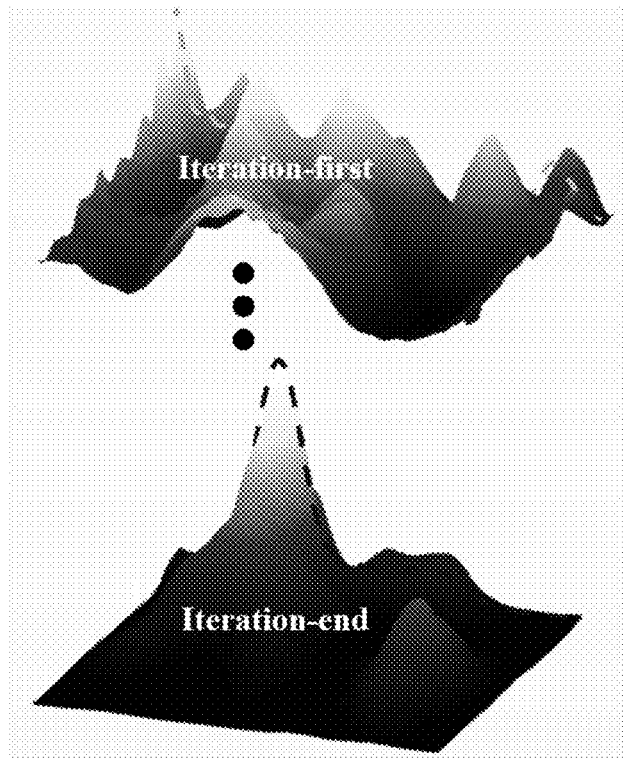
FIG. 8 is a three-dimensional schematic diagram of dual-source electromagnetic data for an electric field according to the present invention.
Figure 9:
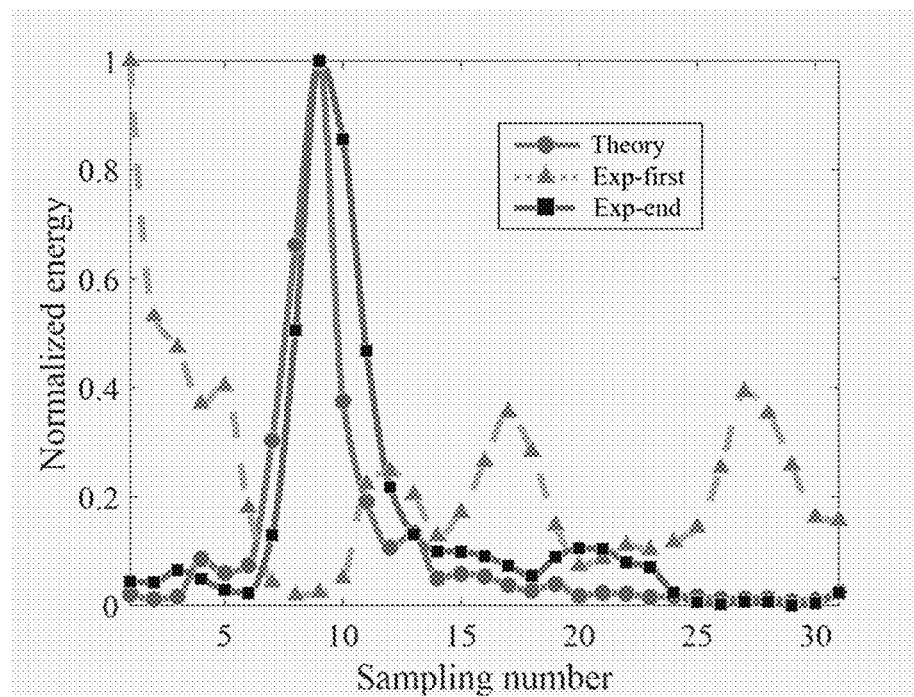
FIG. 9 is a one-dimensional schematic diagram of dual-source electromagnetic data for an electric field according to the present invention.
Figure 10:
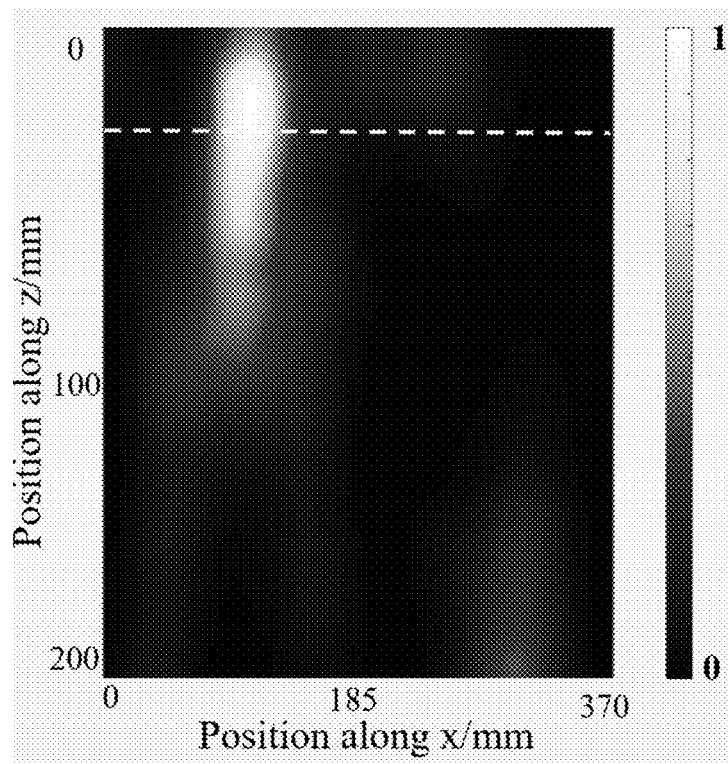
FIG. 10 is a schematic diagram of a dual-source electromagnetic focusing result according to the present invention.
Figure 11:
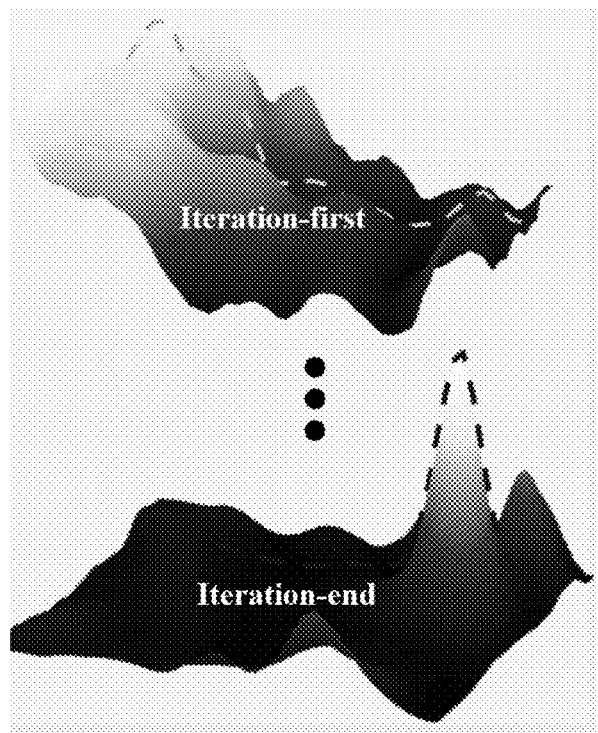
FIG. 11 is a three-dimensional schematic diagram of electromagnetic data with random scattering for an electric field according to the present invention.
Figure 12:
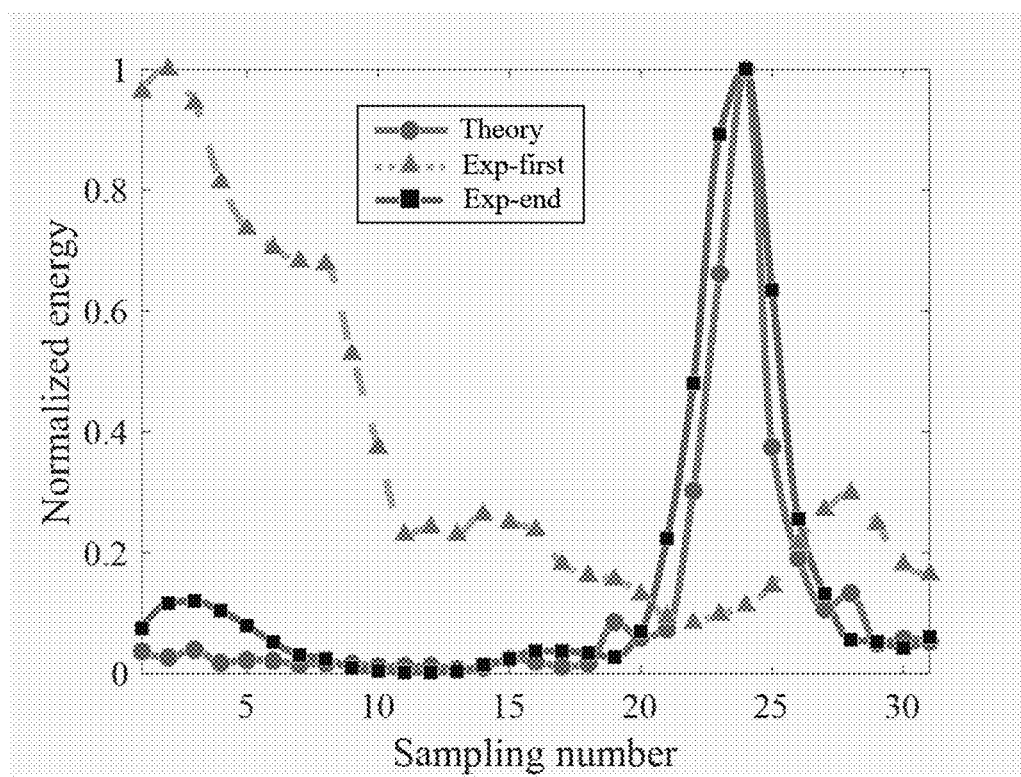
FIG. 12 is a one-dimensional schematic diagram of electromagnetic data with random scattering for an electric field according to the present invention.
Figure 13:
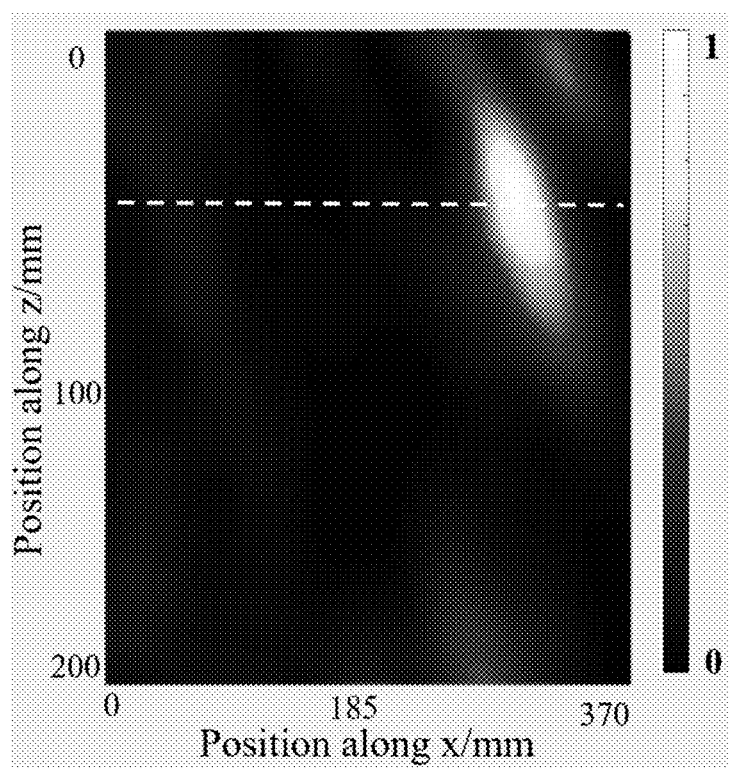
FIG. 13 is a schematic diagram of an electromagnetic focusing result with random scattering according to the present invention.

Furthermore, under different electromagnetic environments, the adjustable focusing metasurface achieves focusing at different positions: FIGS. 5, 6 and 7 are a three-dimensional schematic diagram of an electric field during first iteration and iteration end, a comparison diagram of one-dimensional electric field data (theory, first iteration, and iteration end), and a diagram of a focusing result with different focusing positions, under a single-source electromagnetic environment respectively; FIGS. 8, 9 and 10 are a three-dimensional schematic diagram of an electric field during first iteration and iteration end, a comparison diagram of one-dimensional electric field data (theory, first iteration and iteration end), and a diagram of a focusing result with different focusing positions, under a dual-source electromagnetic environment, respectively; FIGS. 11, 12 and 13 are a three-dimensional schematic diagram of an electric field during first iteration and iteration end, a comparison diagram of one-dimensional electric field data (theory, first iteration, and iteration end), and a diagram of a focusing result with different focusing positions, under an electromagnetic environment with scattering obstacles, respectively. As can be seen, the supervised-evolving learning algorithm provided by the present invention has strong adaption capability and learning capability under different electromagnetic environments, and can achieve focusing at any specified position.

The embodiments in the specification are all described in a progressive manner, and each embodiment focuses on differences from other embodiments, and portions that are the same and similar between the embodiments may be referred to each other.

The above description of the disclosed embodiments enables those skilled in the art to implement or use the present invention. Various modifications to these embodiments will be apparent to those skilled in the art, and the generic principles defined herein may be applied to other embodiments without departing from the spirit or scope of the present invention. Thus, the present invention is not intended to be limited to these embodiments shown herein but is to accord with the broadest scope consistent with the principles and novel features disclosed herein.

The invention claimed is:

1. An eye-like focusing metasurface system driven by a supervised-evolving learning algorithm, comprising:
    a transmissive metasurface,
    an array probe,
    a focusing guidance module, and
    an evolving learning module,
    wherein, after an external electromagnetic wave signal penetrates through the transmissive metasurface, the array probe arranged behind the transmissive metasurface detects external electromagnetic wave data, the focusing guidance module and the evolving learning module analyze an external electromagnetic wave and output a regulation and control strategy for the transmissive metasurface, and a state of the transmissive metasurface changes; then the array probe collects new external electromagnetic wave data, and the focusing guidance module and the evolving learning module further analyze an intensity and characteristics of the external electromagnetic wave data and output a next regulation and control instruction; and
    the process is repeated until the external electromagnetic wave is focused to a specified position.

2. The eye-like focusing metasurface system driven by the supervised-evolving learning algorithm according to claim 1, wherein, to stop repeated iteration after the external electromagnetic wave is focused to the specified position, the following judgment conditions need to be simultaneously satisfied:

$$r(E_{Theory}, E_{Test}) = \frac{C(E_{Theory}, E_{Test})}{\sqrt{\mathrm{Var}[E_{Theory}]\mathrm{Var}[E_{Test}]}} > 85\%$$

$$\rho_m = \frac{E_{Major\_lobe}}{E_{Test_{total}}} \geq 30\%$$

$$\rho_s = \frac{E_{Side\_lobe}}{E_{Test\_total}} < 30\%$$

in the formula, $r(E_{Theory}, E_{Test})$ is an effective correlation coefficient of a theoretical electric field $E_{Theory}$ and a test electric field $E_{Test}$, $C(E_{Theory}, E_{Test})$ is a covariance of the theoretical electric field $E_{Theory}$ and the test electric field $E_{Test}$, $\text{Var}[E_{Theory}]$ is a variance of the theoretical electric field $E_{Theory}$, $\text{Var}[E_{Test}]$ is a variance of the test electric field $E_{Test}$, $\rho_m$ is a main lobe energy ratio of the electromagnetic wave, $E_{Major_{lobe}}$ is a main lobe energy of the electromagnetic wave, $E_{Test_{total}}$ is a total measured electric field energy, $\rho_s$ is a total side lobe energy ratio of the electromagnetic wave, and $E_{Side\_lobe}$ is a side lobe energy of the electromagnetic wave.

3. The eye-like focusing metasurface system driven by the supervised-evolving learning algorithm according to claim 1, wherein the transmissive metasurface is formed by arranging a plurality of unit cells with different switch states, each unit cell being composed of three metal layers; the three metal layers are separated by two layers of F4B media, a surface of a first metal layer is welded with 2 PIN switch diodes, and switch states of the PIN switch diodes are controlled by applied voltages.

4. The eye-like focusing metasurface system driven by the supervised-evolving learning algorithm according to claim 3, wherein the unit cells of the transmissive metasurface, when being externally connected to positive and negative voltages, cause currents to flow in forward and reverse directions, a binary phase is realized with an electromagnetic wave incidence at −50°-50°, and a transmissivity is greater than 95% under a working frequency.

5. The eye-like focusing metasurface system driven by the supervised-evolving learning algorithm according to claim 3, wherein the focusing guidance module is a focus steering network, and the focus steering network consists of a mapping of compensation phases $\Delta\varphi_t$ generated by an electric field $e_t$ to all the unit cells on the transmissive metasurface:

$$\Delta\varphi_t = [\Delta\varphi_t^{(1)}, \ldots, \Delta\varphi_t^{(i)}, \ldots, \Delta\varphi_t^{(N)}] = f_\theta(e_t)$$

in the formula, $\Delta\varphi_t^{(i)}$ is a focus compensation phase required to be satisfied for an $i^{th}$ unit cell, $i \in [1,N]$, and $\theta$ is a network parameter during the training of the focus steering network.

6. The eye-like focusing metasurface system driven by the supervised-evolving learning algorithm according to claim 5, wherein the evolving learning module regulates and controls a voltage of each unit state of the transmissive metasurface at moment t+1 according to the compensation phase $\Delta\varphi_t$ and the collected electric field $e_t$, and a voltage updating scheme is as follows:

$$u_{t+1} = u_t - \frac{\alpha m_t}{1-\beta_1^t} \cdot \frac{\sqrt{1-\beta_2^t}}{\sqrt{v_t} + \epsilon\sqrt{1-\beta_2^t}}$$

in the formula, $u_t$ and $u_{t+1}$ represent regulation and control voltages at moment t and moment t+1, respectively, $\alpha$ and $\epsilon$ are learning parameters, $\beta_1$ and $\beta_2$ are attenuation coefficients of first and second order moments, respectively, $\beta_1^t$ is t power of $\beta_1$, $\beta_2^t$ is t power of $\beta_2$, $m_t$ is a first order moment of a gradient at moment t, and $v_t$ is a second order moment of a gradient at moment t.

7. The eye-like focusing metasurface system driven by the supervised-evolving learning algorithm according to claim 6, wherein calculation formulas of $m_t$ and $v_t$ are as follows:

$$m_t = \beta_1 m_{t-1} + (1-\beta_1)g_t$$

$$v_t = \beta_2 v_{t-1} + (1-\beta_2)g_t^2$$

in the formulas, $g_t$ is a gradient, $m_{t-1}$ is a first order moment of a gradient at moment t−1, and $v_{t-1}$ is a second order moment of a gradient at moment t−1.

* * * * *